United States Patent [19]

Bhadra

[11] Patent Number: 5,350,516

[45] Date of Patent: * Sep. 27, 1994

[54] CONTROL OF ODOR AND SEPTICITY AND PURIFICATION OF SEWAGE AND WASTEWATER

[76] Inventor: Amal K. Bhadra, P.O. Box 91, Greenbelt, Md. 20768-0091

[ * ] Notice: The portion of the term of this patent subsequent to Aug. 25, 2009 has been disclaimed.

[21] Appl. No.: 933,320

[22] Filed: Aug. 21, 1992

Related U.S. Application Data

[63] Continuation-in-part of Ser. No. 813,840, Dec. 27, 1991, Pat. No. 5,141,647.

[51] Int. Cl.$^5$ .............................. C02F 1/58; C02F 3/32
[52] U.S. Cl. ..................................... 210/602; 210/610; 210/620; 210/631; 210/763; 210/916
[58] Field of Search ............... 210/620, 631, 721, 758, 210/763, 916, 610, 611, 602, 606

[56] References Cited

U.S. PATENT DOCUMENTS

| | | |
|---|---|---|
| 653,741 | 7/1900 | Jewell . |
| 1,359,086 | 11/1920 | MacLachlan . |
| 1,511,418 | 10/1924 | MacLachlan . |
| 1,543,939 | 6/1925 | MacLachlan . |
| 2,171,203 | 8/1939 | Urbain et al. ............................ 210/2 |
| 2,877,177 | 3/1959 | Story ...................................... 210/49 |
| 3,411,875 | 11/1968 | Yoshikawa et al. .................. 23/116 |
| 3,522,173 | 7/1970 | Lindman et al. ...................... 210/49 |
| 3,634,232 | 1/1972 | Dunlop .................................. 210/63 |
| 3,829,379 | 8/1974 | Ishida et al. .......................... 210/631 |
| 3,948,774 | 4/1976 | Lindman ................................ 210/192 |
| 3,962,073 | 6/1976 | Yoshikawa et al. ..................... 210/7 |
| 3,963,611 | 6/1976 | Dardenne-Ankringa, Jr. .... 210/758 |
| 3,966,450 | 6/1976 | O'Neill et al. ........................ 210/916 |
| 4,123,355 | 10/1978 | Frosch et al. ........................... 210/50 |
| 4,200,523 | 4/1980 | Balmat .................................... 210/631 |
| 4,304,673 | 12/1981 | Reynolds et al. ..................... 210/721 |
| 4,333,263 | 6/1982 | Adey ..................................... 210/601 |
| 4,340,489 | 7/1982 | Adams et al. ......................... 210/718 |
| 4,412,981 | 11/1983 | Kubicek ................................. 210/758 |
| 4,537,686 | 8/1985 | Borbely et al. ....................... 210/713 |
| 4,541,986 | 9/1985 | Schwab et al. ....................... 210/916 |
| 4,615,873 | 10/1986 | Devuyst et al. ...................... 423/367 |
| 4,622,149 | 11/1986 | Devuyst et al. ...................... 210/717 |
| 4,654,144 | 3/1987 | Sharkey et al. ....................... 210/631 |
| 4,874,530 | 10/1989 | Kobayashi et al. .................. 210/763 |
| 4,880,542 | 11/1989 | Sublette ................................ 210/631 |
| 4,925,569 | 5/1990 | Chou et al. ........................... 210/721 |

OTHER PUBLICATIONS

Abstract: Bhadra, A; The Role of Oxygen in Synthesis of Bacterial Cells; ACS Meeting, Canada, Jun. 5-10, 1988.
Abstract 1150; Sulfur, Radical Chain and the Story of Life; Bhadra. A; 76th Annual Meeting of A.S.B.C.; Jun. 8-12, 1989.
Abstract: The Role of Sulfur in Prebiotic Chemistry, J. of Origin of Life, 1986, p. 286.
Leck, C. and Bagender, L. E., Anal. Chem., 1988, 60, 1680-1683.
Kotronarou, A. and Hoffman, M. R. Research Journal WPCF, 1991, 63(7), pp. 965-970.
DeBusk, T. A. et al., Journal Water Poll. Control Fed., 1989, 61(7), pp. 1217-1224.
Buddhavarapu, L. R. and Hancock, S. J., Water Env. Techn. 1991, 3(3), pp. 41-44.
Bishop, P. L. and Eighmy, T. T., J. Water Poll. Control Fed., 1989, 61(5), pp. 641-648.
Zirschky, J. et al., Water Env. Techn., 1990, 2(8), pp. 37-41. Bhadra, A. K., Water Env. Techn., 1991, 3(12), pp. 55-59.
Maiti, S. K. et al. Journal Water Poll. Control Fed., 1989, 60(12), pp. 2115-2119.

Primary Examiner—Thomas Wyse
Attorney, Agent, or Firm—Oblon, Spivak, McClelland, Maier & Neustadt

[57] ABSTRACT

This invention is a process for controlling odor and septicity of sewage or wastewater and for purifying sewage or wastewater by biological active substances, A source of sulfur dioxide is added to sewage or wastewater along with metal catalyst and sewage or wastewater is aerated. The effect of this treatment is to reduce the generation of hydrogen sulfide and the odor and corrosion associated with this compound and to reduce the need for aeration in the treatment of sewage or wastewater and to purify sewage or wastewater by increasing the metabolic activities of biological active substances added therein, This results in substantial savings in aeration costs.

29 Claims, No Drawings

CONTROL OF ODOR AND SEPTICITY AND PURIFICATION OF SEWAGE AND WASTEWATER

RELATED APPLICATION

This application is a continuation-in-part of Ser. No. 07/813,840, filed Dec. 27, 1991 U.S. Pat. No. 5,141,647.

BACKGROUND OF THE INVENTION

1. Field of the Invention

This invention relates to a process for control of odor and septicity of sewage or wastewater by adding a source of sulfur dioxide to sewage or wastewater, sewage conduit, and sewage systems in the presence of metal catalyst(s). The invention also relates to a process for purification of sewage or wastewater by biological active substances after adding a source of sulfur dioxide therein. A source of sulfur dioxide is selected from the group consisting of sulfur dioxide, sulfite, bisulfite, metabisulfite, pyrosulfite, sulfurous acid, a solution of sulfur dioxide or sulfurous acid in sodium hydroxide or lime or any other alkali. Henceforth, "source of sulfur dioxide" or "sulfur dioxide species" or "active sulfur dioxide species" will be used for any one of the compounds: sulfur dioxide, sulfite, bisulfite, metabisulfite, pyrosulfite, sulfurous acid, a solution of sulfur dioxide in sodium hydroxide or in lime or in any other alkali, and a solution of sulfurous acid in sodium hydroxide or in lime or in any other alkali. The invention also prevents further formation of odoriferous compounds in sewage, and sulfide-induced corrosion.

The invention is particularly addressed to the problem of recovering sewage or wastewater from septicity. In the presence of a source of sulfur dioxide or mixtures thereof, the metabolic conditions of the microorganisms present in sewage or wastewater are modified and improved. In the presence of a source of sulfur dioxide, or mixtures thereof, the microorganisms regain their ability to absorb oxygen from the atmosphere or any other oxygen-containing source and ability to metabolize. The conditions and substances which are detrimental to microbial metabolism are reduced in the presence of active sulfur dioxide species. The seeds of biological active substances added to sewage or wastewater or the microorganisms already present therein, will rapidly remove nutrients from sewage or wastewater in the presence of a source of sulfur dioxide or mixtures thereof. Thus the invention is directed to initiation and promotion of biosynthesis by uptake of oxygen, and purification of sewage or wastewater by increasing the efficiency of the biological active substances.

2. Description of the Prior Art

The characteristics of sewage or wastewater is its highly disagreeable odor. Many organic and inorganic compounds contribute to the formation of this odor. But mostly inorganic and organic sulfur compounds are held responsible for the odor. The principal among the sulfur compounds is hydrogen sulfide. It is also easy to detect. When almost no hydrogen sulfide formation takes place in sewage or wastewater, it is considered as odorless. Therefore, hydrogen sulfide is taken as a representative of odor forming compounds. Hydrogen sulfide in sewage or wastewater creates a public nuisance because of its highly disagreeable odor at level as low as 0.01 parts per million (ppm) in the atmosphere. Breathing by humans of air containing as low as 10 ppm of hydrogen sulfide for a period of time can prove fatal; such accumulations are likely to occur in covered or doomed clarifiers or settling tanks in treatment plants, or in manholes or wet wells in sewerage systems. Besides odor, hydrogen sulfide formation results in heavy corrosion of metal and concrete sewer lines, concrete and metal structures, and metal equipment and machinery. The corrosion is greatly reduced when the formation of hydrogen sulfide can be reduced in sewage. So far it is known, the presence of hydrogen sulfide is also detrimental to the growth of the microorganisms and other biological active substances. The microorganisms and biological active substances can not properly metabolize in the presence of hydrogen sulfide. Thus the efficiency of purification of sewage or wastewater is decreased.

Hydrogen sulfide is also not easily oxidized. It can exist being supersaturated with oxygen in aqueous solution. The occurrence of hydrogen sulfide in the Baltic Sea, the North Sea, and the Atlantic Ocean supersaturated with oxygen has been reported (Leck, C. and Bagender, L. E., Anal. Chem., 1988, 1680–1683).

Although hydrogen sulfide is almost always formed in wastewater or sewage, sewage conduit, and sewage systems, the rate of formation is greatly enhanced in sunder temperature and prolonged anaerobic condition.

The conditions under which hydrogen sulfide is formed in sewage or wastewater is called septic. In fact, the microorganisms present therein turns black and seems lifeless or in serious metabolic disorder. Until this condition is reversed, sewage or wastewater can not be efficiently purified by biological active substances. Any seed of biological active substances added therein will not function, properly in septic condition and will fail to remove the nutrients properly from said sources. By adding a source of sulfur dioxide or mixtures thereof, the altered conditions of sewage or wastewater can be corrected.

Although, many treatments to control formation and regeneration of hydrogen sulfide in sewage or wastewater have been tried, none has been uniformly satisfactory or successful in both gravity systems and force main systems. Among those treatments used have been aeration, chlorination, ozonation, lime, sodium nitrate, activated carbon filtration, odor masking, hydrogen peroxide oxidation, and iron salts.

Ferric Chloride is widely used to control odor as well as for separation of phosphate in many treatment plants with moderate success. Many treatment plants in Europe and some in America have started to treat sewage or wastewater with pure oxygen. By treating with pure oxygen, the problem of odor, corrosion, and septicity have largely been overcome in sane treatment plants. But pure oxygen is not very satisfactory for controlling odor. One plant in Chicago which injects pure oxygen in the force main to control hydrogen sulfide, has to add hydrogen peroxide in the sun, her months in addition to pure oxygen to control hydrogen sulfide.

Pure oxygen is also expensive. It is not a cost-effective process for small plants. Many treatment plants in America are trying to explore some other alternative methods.

To evaluate the possibility of using alternative methods for controlling sewage odor, a literature search was conducted. Several patents were discovered which used sulfur dioxide or sulfurous acid for purification of sewage or wastewater in presence of iron and other metals preferably at a low pH. All the patents discuss methods for purification of water by chemical oxidation. No attempts have been made to purify sewage or wastewater by modifying or improving the biological process. No attempts have been made to purify sewage or wastewater by sulfur dioxide or sulfurous acid followed by biological active substances. None of these methods have been commercially accepted.

One example is U.S. Pat. No. 653,741 issued to Jewell in 1900, involves the use of sulfurous acid solution and scrap iron to produce a reactant solution that is mixed with water to be treated in a liquid process.

U.S. Pat. No. 2,171,203 to Urbain et al. teaches purification of organically polluted water such as sewage by generating $Fe_2(SO_4)_3$ in situ by passing sulfur dioxide through a bed of scrap iron. The oxidizing power generated by this process is responsible for purification of sewage by chemical oxidation. U.S. Pat. No. 3,522,173 to Lindman et al. teaches the treatment of wastewater by the use of sulfur dioxide as an acidifying agent and iron as a flocculating agent to purify sewage or wastewater. However, the Lindman et al. process requires sulfur dioxide gas stream with large amounts of oxygen containing gases for the method to be effective. U.S. Pat. No. 3,948,774 issued Apr. 6, 1976 involves purification of water by treating wastewater with sulfur dioxide and iron between pH 2.4 and 2.6. Further, the use of sulfur dioxide for purification of wastewater is described in U.S. Pat. No. 4,123,355. In this process, sufficient sulfur dioxide is used to reduce the pH of the wastewater, generally in the order of 2 to 3.

Two patents to Maclachan, U.S. Pat. Nos. 511,418 and 1,543,939 each discuss the treatment of sewage sludge with sulfur dioxide gas. However, the patents make no mention of the process as being applicable to water treatment, and neither patent discuss the use of the method for water purification purposes.

Sulfur dioxide is also used as a disinfectant. U.S. Pat. Nos. 4,304,673 and 4,340,489 discuss processes by which wastewater is continuously disinfected by combining with wastewater with sufficient sulfur dioxide so that the wastewater has a selected free sulfur dioxide content of at least 5 mg/liter.

Cyanide can be almost completely oxidized by taking advantage of the oxidative power generated by sulfur dioxide oxidation. U.S. Pat. Nos. 4,537,686, and 4,615,873, and 4,622,149 claim that the cyanide content of industrial wastewater containing the same is removed by treatment with sulfur dioxide or an alkali or alkaline earth sulfite or bisulfite in the presence of excess oxygen and a metal catalyst which is, preferably, copper.

U.S. Pat. No. 2,87,177 issued Mar. 10, 1959 discusses a process of treating highly colored and odoriferous sulfur dyes waste liquors containing alkali metal sulfides with sulfurous acid and thereby converting them into a colorless and odorless liquid.

In all the patents, it appears that the oxidation of sulfur dioxide or other source of sulfur dioxide generate oxidizing power. The sewage and industrial waste has been purified by the oxidative power generated by the oxidation of sulfur dioxide and active sulfur dioxide species. By this way sewage and industrial waste has been purified chemically. But no attempt has been made to purify sewage and industrial waste by biological active substances after modifying and improving the condition of sewage with addition of a source of sulfur dioxide.

Recently, it has been claimed (Kotronarou et al., Research Journal, Wat. Env. Techn, 63(7) 1991, 965), that peroxymonosulfate is a more rapid and efficient oxidant of hydrogen sulfide and as a viable alternative to hydrogen peroxide for the control of sulfide-induced corrosion in concrete Sewer.

In mechanical treatment plants, wastewater is usually purified by activated sludge after some primary treatments. However, efforts are in progress to replace activated sludge by other biological active substances such as algea, and aquatic plants.

Research has been conducted for more than two decades on the use of water hyacinth, an aquatic plant, for treating domestic wastewater. Currently, at least five full scale water hyacinth systems are being used in the U.S. for removing nutrients—nitrogen and phosphorus from secondary effluents. Water hyacinth systems occupy more land than mechanical plants. As such have not been widely used. (DeBusk et al. J. Water Env. Techn. 61(7), 1989, p. 1217).

Smaller aquatic plants such as Duckweed, Pickerel Weed, Cattail, Bulrush, Elodea nuttallii have been proposed by many small communities for efficient purification of wastewater by natural process. However, further research are needed in order to find these plants useful in purification of wastewater (Buddhavarapu et al. Water Env. Techn., 3(3) 1991, 41; Bishop et al., J. Water Poll. Control. Fed. 61(5) 1989, 641; Zirschky et al. Water Env. Techn. 2(8) 1990, 37).

Algae known as activated algae or algal turf has been regarded as one of the most promising process in removing the nutrients from wastewater. Its use in wastewater treatment is a significant development, but it has not been fully explored (Maity et al. J. Water Poll. Control Fed. 60(10), 1988, 2115).

Algal turf has been found useful in purification of water in lagoons, and reefs. U.S. Pat. No. 4,333,263, on algal turf, has been issued to Walter Adey. These group of workers are trying to apply their method in purification of wastewater. Further research and development are needed in order to make activated algae or algal turf useful in purification of sewage or wastewater.

In order to understand the condition of sewage when it is confined in sewage conduit for a long time in the absence of oxygen and at high temperature, a study was made in the laboratory with said source of sulfur dioxide and activated sludge. During the course of the study, said source of sulfur dioxide were added together with metal salts to odoriferous black septic activated sludge. The black color of the activated sludge gradually turned gray and odor greatly reduced. The gray activated sludge turns black when it was allowed to sit in the laboratory in the absence of oxygen and gradually it becomes an increasing source of odor formation. However, on addition of said source of sulfur dioxide and iron salts, the black sludge again regain their gray healthy look and odor was also reduced. Thus it appeared that said source of sulfur dioxide could prevent activated sludge from being septic and essential for the metabolism of the activated sludge.

It is also believed that sulfur in the form of sulfite enters in biological reaction. Thus it appeared that sulfite and other source of sulfur dioxide have great potential in controlling sewage odor, recovering sewage from septicity, modifying the altered biological condition, increasing oxygen uptake in sewage, and promoting microbial metabolism, but said source of sulfur dioxide had never been used as such.

The problem of controlling sewage odor and purification of sewage in a cost-effective way by improving and modifying biological process, has basically not been solved.

It is, therefore, an object of the present invention to provide a process for the elimination of odor in wastewater or sewage, sewage conduit, and sewage systems by aerating and sulfur dioxide-sodium hydroxide treatment in the presence of metal catalysts. Instead of sulfur dioxide-sodium hydroxide solution, sulfite, bisulfite, metabisulfite, or pyrosulfite salts, preferably, alkali metal or alkaline earth metal salts, sulfur dioxide gas, a solution of sulfur dioxide in water, or sulfurous acid as well as mixtures of the various sulfur dioxide sources can be used. The source of sulfur dioxide can be added directly to the sewage or wastewater being treated. In the alternative, the source of sulfur dioxide can be first dissolved in water or in an alkaline solution, such as sodium hydroxide or lime, prior to be added to the sewage or wastewater.

Metal salts such as iron, copper, nickel, manganese, chromium, titanium, vanadium, and any other metals and compounds such as zinc, platinum, peroxydisulfate, peroxydiphosphate, and the like which promotes oxidation of sulfur dioxide or said sulfur dioxide species may be used.

It is a particular object of the present invention to provide a process for the recovery of sewage or wastewater from septicity, increase uptake rate of oxygen therein, and purify sewage or wastewater by initiating and promoting metabolism of biological active substances. It is also an object of the present invention to utilize oxygen injected in the form of any oxygen containing gas in sewage or wastewater and activated biological reactors as fully as possible by increasing oxygen absorbing capacity of said sources and thereby reducing the cost of the operation.

It is also an object of the invention to provide a process by which sulfide-induced corrosion of sewage treatment plants can be overcome.

SUMMARY OF THE INVENTION

The objects of the present invention are provided by a simple process for the utilization of oxidizing and reducing power generated by sulfite oxidation. The process comprises aerating sewage or wastewater with an oxygen containing gas and adding therein a source of sulfur dioxide, or mixtures thereof, in the presence of metal catalysts. The sulfur dioxide species added therein will modify the biological condition of wastewater. The sulfur dioxide species will eliminate the conditions adverse to microbial metabolism and initiate and promote microbial metabolism in wastewater. The oxidative power generated by sulfation, oxidation of sulfur dioxide species, will eliminate sewage odor by oxidizing hydrogen sulfide and other odoriferous compounds and take part in microbial metabolism. The reducing power will initiate and promote biosynthesis.

As a catalyst, metal salts of iron, copper, cobalt, nickel, chromium, manganese, titanium, vanadium, and peroxydisulfate can be used.

The pH of sewage, if necessary, may be raised by adding alkali such as lime, soda ash, sodium bicarbonate, and sodium hydroxide.

The present invention is an improvement over known processes for treating and purifying wastewater or sewage by biological process. The improvement comprises establishing a condition in sewage, sewage conduit, and sewage systems in which oxygen is easily absorbed and utilized for metabolism of the biological active substances.

The special advantage of this process is that it is easy to practice and can be practiced in small as well as in large plants. The added advantage for the plants which disposes sludge by incineration is that sulfur dioxide can be recovered from incinerators and used as gaseous or liquid form by absorbing in sodium hydroxide or water or in any other chemicals. The hidden advantage of this process is that sulfide-induced corrosion will be greatly reduced.

The invention will also provide a process which will readily utilize oxygen supplied to wastewater or sewage, and to the activated sludge or other biological reactors in the form of any oxygen-containing gas in the presence of metal salts and a source of sulfur dioxide or mixtures thereof. The process thereby will prevent loss of oxygen supplied therein. This will reduce the need of aeration of sewage or wastewater and the biological reactors and reduce costs of maintenance and operation of the treatment plants. A source of sulfur dioxide or mixtures thereof, may be added simultaneously at different points and in different amounts together with or without metal salts.

Although the mechanism of this process is not well understood, a possible explanation of the mechanism follows. This invention may be more easily understood when reference is made to the possible mechanism of sulfite or sulfur dioxide oxidation which involves formation of reducing and oxidizing powers and radical chain reactions into which oxygen is incorporated during the course of the reaction. The radicals and the reducing power generated in the course of the reaction may take part in synthesis and other metabolic functions of microbial life. The mechanism of the reaction is as follows:

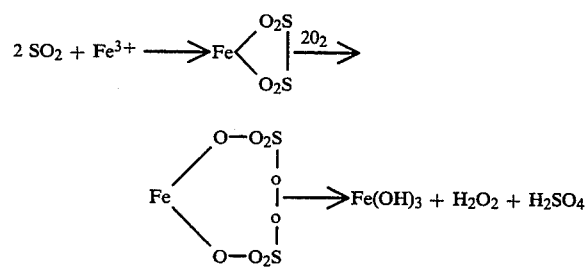

The mechanism of the reaction has been discussed in further details by the inventor in an article in Wat. Envir. & Tech., 3(12), 1991, 55–59.

DESCRIPTION OF SPECIFIC EMBODIMENT

In practice of the process of the present invention, when sewage or wastewater is aerated after adding therein said source of sulfur dioxide or mixtures thereof, and metal catalyst, the septic condition of sewage or wastewater will be eliminated, hydrogen sulfide and other odoriferous compounds will be controlled, the efficiency of the overall biological process will be increased, the activated sludge or other biological active substances will easily remove nutrients from sewage or wastewater. This invention may be regarded as a successful practical demonstration of the importance of sulfite oxidation or oxidation of sulfur dioxide species in the biological system.

Sulfur dioxide is the active species of all the compounds that have been used to treat the sewage or wastewater in accordance with the present invention. Suitable sources of the active sulfur dioxide include sulfur dioxide per se, as well as sulfurous acid, sulfite, bisulfite, metabisulfite, pyrosulfite salts, particularly the alkali metal and alkaline earth metal salts, and a solution of sulfur dioxide or sulfurous acid in sodium hydroxide or lime or in any other alkali. Mixtures of various sources of sulfur dioxide also may be used. The source of sulfur dioxide may be added to the sewage or wastewater to be treated, dissolved in water, or dissolved in an aqueous alkaline solution, such as dilute sodium hydroxide, e.g. 0.1 NaOH. However, the concentration of sodium hydroxide may vary widely. Henceforth, "sulfur dioxide species", "active sulfur dioxide species", or "source of sulfur dioxide" will be used for any one of the compounds: sulfur dioxide-sodium hydroxide solution, sulfurous acid-sodium hydroxide solution, sulfite, bisulfite, metabisulfite, pyrosulfite, sulfurous acid, sulfur dioxide, and a mixture of sulfur dioxide or sulfurous acid in lime or in any other alkali. Reduction of all these compounds either forms dithionous acid or dithionite. Dithionite is a very strong absorbent of oxygen and is readily converted into peroxydisulfate by absorbing oxygen; peroxydisulfate thus formed suffers hydrolytic decomposition into sulfate and hydrogen peroxide. Thus the oxidation of sulfur dioxide species generates a radical chain reaction catalyzed by metal ions. Oxygen is incorporated in the reaction chain which subsequently suffers hydrolytic fission into sulfate and hydrogen peroxide. The chain reaction provide both reducing and oxidizing power which may be used for synthesis and metabolic functions of the biological active substances.

Sulfur dioxide species readily combine with organic compounds. The microorganisms or other biological active substances can metabolize by oxidation of these organo-sulfur compounds. The oxidation of sulfur dioxide species may occur in free state also. Thus the oxidation of sulfur dioxide species may occur in free state and in organic combination. It could be possible that hydrogen sulfide and other odoriferous compounds are oxidized by free as well as by organic bound sulfur dioxide species. But the mechanism is not very clear. The rapid elimination of hydrogen sulfide and other odor forming compounds from septic odoriferous sewage or wastewater and apparent healthy look of biomass caused by simple mixing of sulfur dioxide species in the presence of metal catalyst followed by aeration for few minutes demonstrates a vital role of sulfur dioxide species in microbial metabolism.

Said source of sulfur dioxide or mixtures thereof, may be introduced in sewerage or the treatment systems where it can come in contact with the micro-organisms, and the organic compounds present therein. As a result the organic compounds and the microorganisms will bind with the added sulfur dioxide species. The sulfur dioxide species may be added at the beginning of gravity or force main sewerage, or at the entrance to a lift station or treatment plant, or as the sewage enters a settling tank, or at any other point at which hydrogen sulfide odor and corrosion are known to create a nuisance, and where it is therefore desired to effect hydrogen sulfide oxidation, and the biological reactors. When sulfur dioxide or sulfur dioxide species are added to raw sewage or wastewater, some of it is likely to be carried over to the activated sludge or other biological reactors.

It is always preferred that sulfite, bisulfite, metabisulfite, pyrosulfite are added in the activated sludge or other biological reactors. A solution of sulfur dioxide-sodium hydroxide, and sulfurous acid-sodium hydroxide may also be used. A solution of sulfur dioxide or sulfurous acid in lime or any other alkali may also be added. If sulfur dioxide or sulfurous acid is added directly to the biological reactors, the pH of the reactors should be raised by adding some lime or other alkali preferably before adding sulfurous acid or sulfur dioxide therein. Sufficient metal salts should be added, if not already present.

Oxygen supplied in the form of an oxygen containing gas will be readily absorbed in the presence of a source of sulfur dioxide, or mixtures thereof, in the activated sludge or other biological reactors. This will reduce the need of aeration of activated sludge or other biological active substances. In the presence of sulfur dioxide species, oxygen will be efficiently utilized for synthesis and metabolic functions of the activated sludges or other biological active substances. Since sulfur dioxide species can absorb oxygen from the atmosphere, it is possible to control odor and septicity and purify sewage or wastewater without mechanical aeration. In the presence of sufficient sulfur dioxide species, oxygen from the atmosphere will be rapidly absorbed in sewage or wastewater. Thus the need of mechanical aeration can be completely eliminated.

The amount of sulfur dioxide species to be added to sewage or wastewater may vary widely. It will depend on the amount of microorganisms already present therein, the amount of organic compounds which binds with sulfur dioxide species, the amount of sulfides, hydrogen sulfide and other odor forming compounds present therein, and the points of application.

An amount which will provide free 5 to 100 parts of active sulfur dioxide species per million parts of sewage or wastewater is usually desirable. A concentration of 1 to 300 parts of sulfur dioxide species per million ( thereof "ppm.") parts of sewage or wastewater may be used. Generally a concentration in excess of 300 parts per million offers no advantage. Preferred amounts of sulfur dioxide species to be added to the sewage or wastewater are on the order of free 2 to about 30 ppm.

Sulfite, bisulfite, metabisulfite or pyrosulfite may be purchased from the market and added directly in the form of solid. However, it is always preferable to add as an aqueous solution. These compounds may be used as alkali or alkaline earth salt or in the form of any other salt. Sulfur dioxide or sulfurous acid and sodium hydroxide may also be added separately. But it is always advantageous to mix sulfur dioxide or sulfurous acid with sodium hydroxide solution and then add to sewage or wastewater.

Sulfur dioxide-sodium hydroxide solution may be made in any convenient way by passing sulfur dioxide gas into a solution of sodium hydroxide or it may be prepared by mixing a solution of sodium hydroxide with an aqueous solution of sulfur dioxide in water or with liquid sulfur dioxide. Sulfur dioxide-sodium hydroxide solution may be diluted before adding to sewage or wastewater. A solution of sulfur dioxide-potassium hydroxide may also be used instead of sulfur dioxide-sodium hydroxide solution. Similarly, sulfur dioxide my be absorbed in lime or any other alkali and may be used similarly. A solution of sulfur dioxide-sodium hydroxide will probably contain a mixture of compounds which is known to us as sulfite, bisulfite, metabisulfite, and pyrosulfite. Sulfur dioxide may be recovered from the incinerators or it can be prepared by burning sulfur.

Sulfation, oxidation of sulfur dioxide species to sulfate, does not take place in the absence of metal ions. The process of sulfation is always catalyzed by metal ions. Usually, sewage or wastewater contains various types of metal ions which could be regarded as sufficient for sulfation. But the metals present therein may be in the form of organo-metallic complexes and may not be always available for catalytic oxidation of sulfur dioxide species. From experimental observations, it has been found that sulfation takes place to a considerable extent even when no metal ions are added to sewage or wastewater. Addition of metal salts, however, considerably improves the process of sulfation.

Any type of metal salts or any metal salts which supports the process of sulfation my be used. Preferably, easily available and cheap salts of metals such as iron, copper, nickel, manganese, cobalt, chromium, titanium, and vanadium. The metal salts of platinum, osmium, etc. which support sulfation may be used but is not practicable. A combination of metal salts such as iron and copper, iron and manganese, iron and vanadium, and the like may be used. The metals may be used in the form of any salts such as chloride, nitrate, nitrite, sulfate, and phosphate. The metals may be present in their salts in any valency state.

The amount of metal salts need to be added for sulfation may widely vary. This will depend on many factors such as toxicity of the metal, the need of the metal ions other than its use for catalyzing the oxidation. Iron may be used from 0.1 ppm to 25 ppm as Fe or even more. In addition to act as a catalyst, it will react with phosphate and separate it from sewage by precipitation. Most of the metals other than iron, are added in trace amounts, from 0.01 to 5 ppm. In wastewater treatment plants, waste iron salts such as Ferric Chloride, Ferric Sulfate, Ferrous Chloride, and Ferrous Sulfate are added which themselves contain a number of other metal salts.

Preferred amount of ferric chloride or ferrous sulfate to be added to wastewater or domestic sewage are on the order of 1 to 8 ppm iron as Fe. Other metal salts such as copper, manganese may be added together with iron from 0.1 to 2 ppm. However, the amount of copper, manganese, nickel, and similar metals may vary widely. The range may vary from 0.1 to 15 ppm. The cost of the chemicals play a vital role in selection of metal salts. Metal salts may be used in larger doses, if they are not toxic and expensive. The metal salts may be used before or after the addition of sulfur dioxide species to sewage or wastewater. Metal salts and sulfur dioxide species may be mixed together before it is added to sewage or wastewater in which case extra precaution must be taken to make sure that a substantial part of sulfur dioxide species is not oxidized to sulfate before it is properly mixed with sewage or wastewater.

Sewage or wastewater may be aerated with any oxygen containing gas. While sewage or wastewater is aerated, a sulfur dioxide species or mixtures thereof, may be added therein along with metal salts. Sewage or wastewater may also be aerated after adding therein a sulfur dioxide species or mixtures thereof. Sewage or wastewater may be aerated before and after addition of said source of sulfur dioxide species therein. Aeration is always beneficial in treatment of sewage or wastewater.

In most treatment plants, aeration is done with compressed or diffused air.

Oxygen supplied in the form of compressed air to sewage or wastewater is only partially used. Because nitrogen present in air (80%) acts as an purging agent and drives out a substantial part of oxygen supplied therein. To overcome these problem, many wastewater treatment plants use pure oxygen or air rich in oxygen. This problem will be considerably eliminated when a sulfur dioxide species or mixtures thereof, and metal salts are added to sewage or wastewater followed by aeration. Said sulfur dioxide species will bind with organic compounds. The organically bound sulfur dioxide species in the presence of a metal catalyst will rapidly absorb oxygen in raw sewage or wastewater, or in the biological reactors. Thus said source of sulfur dioxide added to sewage or wastewater or biological reactors will save a substantial amount of oxygen purged therein from being waste. Thus the need of aeration of raw sewage or wastewater and biological reactors will be reduced. This will cut cost of aeration considerably. It may be mentioned here that each wastewater treatment plant has to spent about 35 to 40 percent of their total budget for aeration.

A source of sulfur dioxide or mixtures thereof, added to sewage or wastewater and to activated sludge reactors or reactors of other biological active substances will absorb oxygen from the atmosphere, if oxygen is not mechanically supplied therein. Thus by proper designing the treatment plants, it will be possible to purify sewage or wastewater without mechanical aeration.

Addition of sulfur dioxide-sodium hydroxide solution or sulfurous acid-sodium hydroxide solution to sewage or wastewater or to the biological reactors will raise its pH. Only dilute solutions of sodium hydroxide (0.01 to 1.0N) should be used so that pH of sewage is raised between 7 and 8. Addition of a solution of sodium hydroxide and sulfur dioxide or sulfurous acid will reduce the need of adding lime to sewage or wastewater in order to raise its pH. This will reduce the total volume of sludge. The sludge thus produced can be easily incinerated. If the sludge is not incinerated, costs of transportation will be reduced. This will mean a substantial saving for the treatment plants which use lime to raise the pH of sewage. Because sludge of many such plants contain about 40 percent lime in it.

Lime and sulfur dioxide or sulfurous acid may be added to sewage or wastewater and to the biological reactors separately or as a mixture instead of a mixture of sodium hydroxide and sulfur dioxide or sulfurous acid.

The pH of sewage or wastewater usually lies between 6 and 8. Sometimes, it may vary widely. The pH of sewage may be adjusted with acid or alkali or lime. Most treatment plants use some kind of metal salts. These salts are mostly acidic. As a result, the pH of sewage or wastewater goes down which is elevated usually by addition of lime. A mixture of sodium hydroxide and sulfur dioxide or sulfurous acid may be added to raise the pH of sewage or wastewater. The preferred pH range of the activated sludge reactors or reactors of other biological active substances is between 7 and 9 and of raw sewage before the biological process is between 6.5 and 8.

In sewage systems, sewage conduit, and pumping stations, a source of sulfur dioxide or mixtures thereof, may be added without metal salts and aeration. If possible, sewage may be aerated for sometime, and some metal salts may also be added therein. If the treatment of sewage or wastewater starts in the treatment plant, then a source of sulfur dioxide, or mixtures thereof, should be added as soon as possible combined with aeration and with metal salts. If necessary an alkali such as lime or soda ash, sodium hydroxide may be added simultaneously or afterwards in the Grit Chambers, or in the Primary Reactors or the Biological Reactors. However, the addition of sulfur dioxide species in the form of sulfur dioxide-sodium hydroxide or sulfurous acid-sodium hydroxide solution will in most cases eliminate the need of further addition of any alkali therein. Sulfite, bisulfite, pyrosulfite, metabisulfite, or sulfite waste from industrial source may also be used. In fact, it will be more convenient to use these salts than sulfur dioxide or sulfurous acid and their mixtures in alkali.

After addition of sulfur dioxide species to raw sewage or wastewater along with metal salts, it should be aerated for 5 to 30 minutes or more. Aeration for longer periods is always beneficial. In subsequent operation of the treatment plants, the need for aeration will be reduced because sulfur dioxide species added therein will enter into biological reactions and oxygen will be absorbed and utilized much more efficiently. Sulfation is one of the principal pathway through which oxygen works in different functions of life.

In order to more fully illustrate the nature of the invention and the manner of practicing the same, the following Examples are presented:

EXAMPLE 1

About 1 liter of raw sewage which contained about 1 PPM hydrogen sulfide was transferred into a glass container. An aliquot of 2 ml of an aqueous solution of sulfurous acid containing 100 PPM of active sulfur dioxide was mixed with 2 ml 0.1N sodium hydroxide and added to the sewage with stirring for 15 minutes. The color of the biomass present in the sewage slowly turned gray. After sulfurous acid-sodium hydroxide solution was added, no odor due to hydrogen sulfide could be perceived.

EXAMPLE 2

About 1 liter of raw sewage which contained about 1 PPM hydrogen sulfide was transferred into a glass container. An aliquot of 1 ml of an aqueous solution of sulfurous acid containing 50 PPM of active sulfur dioxide was added to the sewage with stirring for 15 minutes. The color of the biomass present in sewage slowly turned gray and the odor of sewage could no longer be perceived.

EXAMPLE 3

About 1 liter of raw sewage which contained about 1 PPM hydrogen sulfide was transferred into a glass container. An aliquot of 0.5 ml of an aqueous solution of sulfurous acid containing 25 PPM of active sulfur dioxide was added to the sewage with stirring for 15 minutes. The treated sewage did not give any odor of hydrogen sulfide.

EXAMPLE 4

About 1 liter of raw sewage which contained about 1 PPM hydrogen sulfide was transferred into a glass container. An aliquot of 1.0 ml of an aqueous solution of sulfurous acid containing 5 PPM of active sulfur dioxide was added to the sewage with stirring for 15 minutes. The biomass present in sewage turned gray but a little odor of hydrogen sulfide could be perceived in sewage.

EXAMPLE 5

One liter of fresh sewage containing 0.3 PPM hydrogen sulfide is transferred into a 2 liter beaker. An aliquot of 1 ml of an aqueous solution of sulfurous acid containing 10 PPM of active sulfur dioxide is added to the sewage with stirring for 5 minutes. An aliquot of 0.2 ml aqueous solution of copper sulfate which contains 0.2 mg of copper as Cu is added to sewage with stirring and aerated for 5 minutes. After aeration, an aliquot of 500 ml of sewage is transferred into a standard joint wash bottle. The wash bottle is connected with teflon tubing in such a way that any gaseous components present in sewage can be purged out with nitrogen and trapped in solution of zinc acetate. The unreacted hydrogen sulfide in sewage is purged with pure nitrogen gas. The purged hydrogen sulfide is trapped in a solution of 2% zinc acetate. Purging is done for 1 hour. After 1 hour, the trapped hydrogen sulfide is determined by standard molybdenum blue method. Hydrogen sulfide in raw sewage is determined in the same way by the molybdenum blue method by purging with nitrogen.

The results indicate that about 95% hydrogen sulfide is reduced by this treatment.

EXAMPLE 6

1 liter of raw sewage is transferred into a 2 liter beaker which contains about 0.3 ppm of hydrogen sulfide. A solution of sodium sulfite which contains 8 ppm of active sulfur dioxide is added to sewage with stirring. Then a solution of ferric chloride which contains 2 mg of iron as Fe is added with stirring. The treated sewage is aerated for 5 minutes. An aliquot of 500 ml of treated sewage is transferred into a standard joint wash bottle. The unreacted hydrogen sulfide present therein is purged with pure nitrogen gas. The purged hydrogen sulfide is trapped in 8 ml of 2% zinc acetate solution. Trapped hydrogen sulfide is determined by standard molybdenum blue method. Hydrogen sulfide in raw sewage is also determined by the same method after recovering hydrogen sulfide from raw sewage by purging with nitrogen. The results indicate that about 90% hydrogen sulfide is reduced.

EXAMPLE 7

1 liter of raw sewage is transferred into a 2 liter beaker. The raw sewage contains 0.2 ppm of hydrogen sulfide. A solution of sulfite which contains 2 ppm of active sulfur dioxide is added to sewage with stirring. A solution of ferric chloride containing 2 PPM iron as Fe is added to sewage with stirring. Thereafter, the treated sewage is aerated for 5 minutes and allowed to sit in the laboratory for 30 minutes. An aliquot of 500 ml is then transferred into a standard joint wash bottle and unreacted hydrogen sulfide is purged by nitrogen and trapped in a 2% zinc acetate solution. Hydrogen sulfide is determined by standard molybdenum blue method. Hydrogen sulfide in raw sewage is also determined by the same method after recovering from sewage by purging with nitrogen. The results indicate that more than 90% hydrogen sulfide is reduced.

EXAMPLE 8

1 liter of raw sewage is transferred into a 2 liter beaker. The raw sewage contains 2 ppm of hydrogen sulfide. A solution of sodium bisulfite which contains 25 mg of active sulfur dioxide is added to sewage with stirring. A solution of waste ferric chloride which contains 3 mg of iron as Fe is added to sewage with stirring. The treated sewage is aerated for 5 minutes and allowed to sit in the laboratory for 30 minutes. After thoroughly mixing, an aliquot of 500 ml of treated sewage is transferred into a standard joint wash bottle and purged with nitrogen for 1 hour. The purged gases is trapped in a 2% zinc acetate solution. Hydrogen sulfide is treated by the standard molybdenum blue method. Hydrogen sulfide in raw sewage is also determined by the same way. The results indicate that all hydrogen sulfide has been oxidized by this treatment Pursuant to the requirements of the patent statutes, the principle of this invention has been explained and exemplified in a manner so that it can readily practiced by those skilled in the art, such exemplification including what is considered to represent the best embodiment of the invention. However, it should be clearly understood that, within the scope of the appended claims, the invention may be practiced by those skilled in the art, and having the benefit of the disclosure, otherwise than as specifically described and exemplified herein.

I claim:

1. A process for treating sewage or wastewater for control of odor and septicity and for purification thereof, comprising the steps of:
    adding to said sewage or wastewater to be treated a source of sulfur dioxide selected from the group consisting of sulfur dioxide, sulfite, bisulfite, metabisulfite, sulfurous acid, pyrosulfite, and mixtures thereof;
    adding a metal salt catalyst to said sewage or wastewater to be treated, and
    aerating the sewage or wastewater.

2. The process of claim 1 wherein said source of sulfur dioxide is dissolved in water prior to being added to the sewage or wastewater.

3. The process of claim 1 wherein said sulfite, bisulfite, metabisulfite, and pyrosulfite are added to the sewage or wastewater as alkali or alkaline earth metal salt.

4. The process of claim 1 wherein said source of sulfur dioxide is added at a concentration of 1 to 300 parts of active sulfur dioxide per million parts of sewage or wastewater being treated.

5. The process of claim 1 wherein said source of sulfur dioxide is added at a concentration of 2 to 30 parts of active sulfur dioxide per million parts of sewage or wastewater being treated.

6. The process of claim 1 wherein said source of sulfur dioxide is dissolved in a solution of lime or ammonium hydroxide or soda ash, or mixtures thereof, prior to being added to the sewage or wastewater.

7. The process of claim 1 wherein said source of sulfur dioxide is in the gaseous, liquid or solid state.

8. The process of claim 1 wherein said source of sulfur dioxide is in the form of sulfurous acid or sulfurous acid dissolved in water.

9. The process of claim 1 wherein said metal salt catalyst is selected from the group consisting of iron, copper, cobalt, nickel, chromium, manganese, titanium, and vanadium salts.

10. The process of the claim 1 wherein the metal cation of said metal salt catalyst may be present in any valency state from 0 to 8, wherein said metal salt catalyst is selected from the group consisting of nitrate, nitrite, sulfate, sulfite, chloride, and phosphate salts, and wherein said catalyst is added at a concentration of 0.1 to 25 ppm metal.

11. The process of claim 1 wherein the metal salt catalyst is ferric chloride and wherein said ferric chloride is added at a concentration of 0.01 to 25 ppm iron as Fe.

12. The process of claim 11 wherein said ferric chloride is added at a concentration of 1 to 8 ppm iron as Fe.

13. The process of claim 1 wherein the metal salt catalyst is ferric sulfate and wherein said ferric sulfate is added at a concentration of 0.01 to 25 ppm iron as Fe.

14. The process of claim 13 wherein said ferric sulfate is added at a concentration of 1 to 8 ppm iron as Fe.

15. The process of claim 1 wherein the metal salt catalyst is a mixture of more than one metal salt.

16. The process of claim 1 wherein the metal salt catalyst comprises a mixture of different metal salts added at different concentrations.

17. The process of claim 1 wherein said metal salt catalyst comprises a mixture of iron and copper salts, wherein concentration range of iron is from 0.5 to 25 ppm as Fe and the concentration range of copper is from 0.01 to 3 ppm as Cu.

18. The process of claim 1 wherein aeration is done by any oxygen containing gas.

19. The process of claim 1 wherein a biological active substance selected from the group consisting of activated sludge, algae, and aquatic plants, and mixtures thereof, and is added to the sewage or wastewater after addition of said source of sulfur dioxide.

20. The process of claim 1 wherein an oxidizing agent is added to the sewage or wastewater to initiate oxidation of said source of sulfur dioxide.

21. The process of claim 1 wherein addition of said source of sulfur dioxide or mixtures thereof, to wastewater or sewage, sewage systems, and sewage conduit reduces the corrosion of the treatment plants and sewage conduit.

22. The method of claim 1, wherein said process is a process for treating sewage.

23. A process of treating sewage or wastewater for control of odor and septicity and for purification thereof, comprising the steps of:
    adding to said sewage or wastewater a source of sulfur dioxide selected from the group consisting of sulfur dioxide, sulfite, bisulfite, metabisulfite, pyrosulfite, sulfurous acid, and mixtures thereof;
    adding a biologically active substance selected from the group consisting of activated sludge, algae, aquatic plants, and mixtures thereof to the sewage or wastewater after the addition of said source of sulfur dioxide, and
    aerating the sewage or water.

24. The process of claim 23 wherein aeration is done by any oxygen containing gas.

25. The method of claim 23, wherein said process is a process for treating sewage.

26. A process of treating sewage or wastewater for control of odor and septicity and purification thereof, comprising the steps of:
    adding to said sewage or wastewater to be treated a source of sulfur dioxide selected from the group consisting of sulfur dioxide, sulfite, bisulfite, metabisulfite, pyrosulfite, sulfurous acid, and mixtures thereof;
    adding a metal salt catalyst to the sewage or wastewater; and
    adding a biologically active substance selected from the group consisting of activated sludge, algae, aquatic plants, and mixtures thereof to said sewage or wastewater after the addition of said source of sulfur dioxide.

27. The method of claim 26, wherein said process is a process for treating sewage.

28. A process of treating sewage or wastewater for control of odor and septicity and purification thereof, consisting of the steps of:

adding 1 to 300 ppm of a source of sulfur dioxide selected from the group consisting of sulfur dioxide, sulfite, bisulfite, metabisulfite, sulfurous acid, pyrosulfite, solution of sulfur dioxide in sodium hydroxide, a solution of sulfurous acid in sodium hydroxide, and mixtures thereof to a million parts of sewage or wastewater; and adding a biologically active substance selected from the group consisting activated sludge, algae, aquatic plants, and mixtures thereof to said sewage or wastewater after the addition of said source of sulfur dioxide.

29. The method of claim 28, wherein said process is a process for treating sewage.

* * * * *

UNITED STATES PATENT AND TRADEMARK OFFICE
CERTIFICATE OF CORRECTION

PATENT NO. : 5,350,516         Page 1 of 2
DATED      : September 27, 1994
INVENTOR(S): Amal K. Bhadra It is certified that error appears in the above-indentified patent and that said Letters Patent is hereby corrected as shown below:

On title page, item [57]:
ABSTRACT, Line 3
Delete "," and insert --.-- after
biological active substances ABSTRACT, Line 12
Delete "," and insert --.-- after
substances added therein Column 2, Line 24
Delete "sunder" and insert --summer-- before
temperature and prolonged anaerobic condition.

Column 2, Line 32
Delete "," after
not function

Column 2, Line 51
delete "sane" and insert --some-- before
treatment plants.

Column 2, Line 55
Delete "sun, her" and insert --summer-- before
months in addition to Column 8, Line 38
Delete "free" and insert --from-- before
5 to 100 parts of

UNITED STATES PATENT AND TRADEMARK OFFICE
CERTIFICATE OF CORRECTION

PATENT NO. : 5,350,516
DATED : September 27, 1994
INVENTOR(S) : Amal K. Bhadra

It is certified that error appears in the above-indentified patent and that said Letters Patent is hereby corrected as shown below:

Column 8, Line 46
delete "free" and insert —from— before
2 to about 30 ppm.
Column 8, Line 66
delete "my" and insert —may— after
sodium hydroxide solution. Similarly, sulfur dioxide
Column 9, Line 19
Delete "my" and insert —may— before
be used. Prefera- Signed and Sealed this Twenty-first Day of February, 1995

Attest:

BRUCE LEHMAN

Attesting Officer     Commissioner of Patents and Trademarks